US012634023B2

(12) United States Patent (10) Patent No.: US 12,634,023 B2

Piirainen et al. (45) Date of Patent: May 19, 2026

(54) INTERFERENCE REJECTION IN COOPERATIVE MULTI-POINT COMMUNICATION

(71) Applicant: NOKIA SOLUTIONS AND NETWORKS OY, Espoo (FI)

(72) Inventors: Olli Piirainen, Oulu (FI); Jari Ylioinas, Oulu (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 388 days.

(21) Appl. No.: 18/555,399

(22) PCT Filed: Apr. 20, 2021

(86) PCT No.: PCT/EP2021/060198

§ 371 (c)(1),
(2) Date: Oct. 13, 2023

(87) PCT Pub. No.: WO2022/223100

PCT Pub. Date: Oct. 27, 2022

(65) Prior Publication Data

US 2024/0204891 A1 Jun. 20, 2024

(51) Int. Cl.
*H04B 17/345* (2015.01)
*H04B 7/024* (2017.01)
*H04L 25/02* (2006.01)

(52) U.S. Cl.
CPC ........... *H04B 17/345* (2015.01); *H04B 7/024* (2013.01); *H04L 25/0204* (2013.01)

(58) Field of Classification Search
CPC ... H04B 17/345; H04B 7/024; H04L 25/0204; H04L 25/021; H04L 25/0244; H04L 25/03012; H04L 25/03331

(Continued)

(56) References Cited

U.S. PATENT DOCUMENTS 7,003,451 B2 * 2/2006 Kjorling .............. G10L 21/038
375/240
9,112,744 B1 8/2015 Venkatesh et al.
(Continued)

FOREIGN PATENT DOCUMENTS

WO 2016/082040 A1 6/2016
WO 2020/226538 A1 11/2020

OTHER PUBLICATIONS

International Search Report and Written Opinion dated Mar. 3, 2022 corresponding to International Patent Application No. PCT/EP2021/060198.

*Primary Examiner* — Don N Vo
(74) *Attorney, Agent, or Firm* — SQUIRE PATTON BOGGS (US) LLP

(57) ABSTRACT

This document discloses a solution for performing interference cancellation in a radio receiver. According to an aspect, there is provided a method for an apparatus of an access node, comprising: receiving, by the apparatus from a first radio unit of the access node via a first interface, a first spectrally whitened channel parameter and a first spectrally whitened data stream; receiving, by the apparatus from a second radio unit of the access node via a second interface, a second spectrally whitened channel parameter and a second spectrally whitened data stream; summing, by the apparatus, the first spectrally whitened channel parameter with the second spectrally whitened channel parameter and summing the first spectrally whitened data stream with the second spectrally whitened data stream; and extracting, by the apparatus, a desired data stream from the summed spectrally whitened data streams by using the sum of the first spectrally whitened channel parameter and the second spectrally whitened channel parameter.

17 Claims, 5 Drawing Sheets

(58) Field of Classification Search
USPC ....................................................... 455/67.13
See application file for complete search history.

(56) References Cited

U.S. PATENT DOCUMENTS

| 10,985,948 | B2 * | 4/2021 | Hosseini | ............. | H04B 1/1036 |
|---|---|---|---|---|---|
| 2007/0002983 | A1 * | 1/2007 | Steele | ................. | H04B 7/0854 |
| | | | | | 375/350 |
| 2013/0003896 | A1 | 1/2013 | Weisman et al. | | |
| 2017/0026205 | A1 * | 1/2017 | Agee | ..................... | H04W 52/52 |
| 2022/0070027 | A1 * | 3/2022 | Huang | ............... | H04W 88/085 |

* cited by examiner

INTERFERENCE REJECTION IN COOPERATIVE MULTI-POINT COMMUNICATION

FIELD

Various embodiments described herein relate to the field of wireless communications and, particularly, to performing interference rejection in connection with cooperative multi-point communication.

BACKGROUND

Cooperative multi-point (CoMP) communication refers to a communication scenario where neighboring base stations of a cellular communication system share channel state information to coordinate their downlink transmissions and/or to jointly process received uplink signals.

BRIEF DESCRIPTION

Some aspects of the invention are defined by the independent claims.

Some embodiments of the invention are defined in the dependent claims.

The embodiments and features, if any, described in this specification that do not fall under the scope of the independent claims are to be interpreted as examples useful for understanding various embodiments of the invention. Some aspects of the disclosure are defined by the independent claims.

According to an aspect, there is provided an apparatus comprising means for performing: receiving, from a first radio unit of the access node via a first interface, a first spectrally whitened channel parameter and a first spectrally whitened data stream; receiving, from a second radio unit of the access node via a second interface, a second spectrally whitened channel parameter and a second spectrally whitened data stream; summing the first spectrally whitened channel parameter with the second spectrally whitened channel parameter and summing first spectrally whitened data stream with the second spectrally whitened data stream; and extracting a desired data stream from the sum of the spectrally whitened data streams by using the sum of the first spectrally whitened channel parameter and the second spectrally whitened channel parameter.

In an embodiment, the means comprise at least one processor and at least one memory including computer program code, wherein the at least one memory and computer program code are configured, with the at least one processor, to cause the performance of the apparatus.

According to an aspect, there is provided an apparatus comprising at least one processor and at least one memory including computer program code, wherein the at least one memory and computer program code are configured, with the at least one processor, to cause the apparatus to: receive, from a first radio unit of the access node via a first interface, a first spectrally whitened channel parameter and a first spectrally whitened data stream; receive, from a second radio unit of the access node via a second interface, a second spectrally whitened channel parameter and a second spectrally whitened data stream; sum the first spectrally whitened channel parameter with the second spectrally whitened channel parameter and sum first spectrally whitened data stream with the second spectrally whitened data stream; and extract a desired data stream from the sum of the spectrally whitened data streams by using the sum of the first spectrally whitened channel parameter and the second spectrally whitened channel parameter.

In an embodiment, the second radio unit is spatially so remote from the first radio unit that a radio channel between the second radio unit and a source device for the data stream is uncorrelated with a radio channel between the first radio unit and the source device.

In an embodiment, the first spectrally whitened channel parameter represents power of a first spectrally whitened radio channel estimated by the first radio unit, and wherein the second spectrally whitened channel parameter represents power of a second spectrally whitened radio channel estimated by the second radio unit.

In an embodiment, the first spectrally whitened channel parameter and the second spectrally whitened channel parameter are represented by $$H_i^H R_{n,i}^{-1} H_i$$

where $H_i$ represents a channel state of a radio channel, $$R_{n,i}^{-1}$$

represents an inverse covariance matrix of interference estimated from the channel state, H represents hermitean transpose of a matrix, and i is an index of a radio unit.

In an embodiment, the first spectrally whitened data stream and the second spectrally whitened data stream represents a spectrally whitened output of a matched filter matched to a radio channel between the respective radio unit and the terminal device.

In an embodiment, the first spectrally whitened data stream and second spectrally whitened data stream are represented by $$H_i^H R_{n,i}^{-1} y_i$$

where $H_i$ represents a channel state of a radio channel, $$R_{n,i}^{-1}$$

represents an inverse covariance matrix of interference estimated from the channel state, H represents hermitean transpose of a matrix, $y_i$ represents a data stream received by a radio unit i, and i is an index of the radio unit.

In an embodiment, the first spectrally whitened channel parameter and the second spectrally whitened channel parameter are represented by $$\tilde{H}_i^H \tilde{H}_i, \text{ where}$$

$$\tilde{H}_i = L_i H_i, \text{ and where}$$

$$R_{n,i}^{-1} = L_i^H L_i$$

3 where $$L_i^H L_i$$

represents a Cholesky decomposition of an inverse interference covariance matrix $$R_{n,i}^{-1}$$

in radio unit i, H represents hermitean transpose of a matrix, and i is an index of the radio unit.

In an embodiment, the apparatus is comprised in a distributed unit connected to a plurality of radio units, the plurality of radio units including the first radio unit and the second radio unit.

In an embodiment, the apparatus is comprised in one of the first radio unit and the second radio unit, and wherein the wherein the at least one memory and computer program code are configured, with the at least one processor, to cause the apparatus to output the desired data stream to a distributed unit connected to a plurality of radio units, the plurality of radio units including the first radio unit and the second radio unit.

According to an aspect, there is provided an apparatus for a radio unit of an access node, comprising means for performing: receiving, from a terminal device, a first data stream via a radio channel and a first receiver antenna and at least a second data stream via the radio channel and a second receiver antenna; performing channel estimation of the radio channel and estimating interference imposed on the received first data stream and the second data stream in the radio channel; computing, on the basis of the interference estimation, a spectrally whitened channel parameter representing channel state information; performing interference rejection combining for the received first data stream and second data stream, wherein the interference rejection combining comprises spectral whitening of the received first data stream and second data stream by using the estimated interference and further comprises combining the first data stream with the second data stream, thus providing a spectrally whitened data stream; and outputting, via an interface, the spectrally whitened data stream and the spectrally whitened channel parameter to another radio unit of the access node or to a distributed unit of the access node, the distributed unit connected to a plurality of radio units of the access node.

In an embodiment, the means comprise at least one processor and at least one memory including computer program code, wherein the at least one memory and computer program code are configured, with the at least one processor, to cause the performance of the apparatus.

According to an aspect, there is provided an apparatus for a radio unit of an access node, comprising at least one processor and at least one memory including computer program code, wherein the at least one memory and computer program code are configured to, with the at least one processor, cause the apparatus to: receive, from a terminal device, a first data stream via a radio channel and a first receiver antenna and at least a second data stream via the radio channel and a second receiver antenna; perform channel estimation of the radio channel and estimating interference imposed on the received first data stream and the second data stream in the radio channel; compute, on the basis of the interference estimation, a spectrally whitened channel parameter representing channel state information; perform interference rejection combining for the received first data stream and second data stream, wherein the interference rejection combining comprises spectral whitening of the received first data stream and second data stream by using the estimated interference and further comprises combining the first data stream with the second data stream, thus providing a spectrally whitened data stream; and output, via an interface, the spectrally whitened data stream and the spectrally whitened channel parameter to another radio unit of the access node or to a distributed unit of the access node, the distributed unit connected to a plurality of radio units of the access node.

In an embodiment, the spectrally whitened channel parameter represents power of a spectrally whitened radio channel.

In an embodiment, the spectrally whitened channel parameter is represented by $$H^H R_n^{-1} H$$

where H represents a channel state of the radio channel, $$R_n^{-1}$$

represents an inverse covariance matrix of the estimated interference, and H represents hermitean transpose of a matrix.

In an embodiment, the spectrally whitened data stream represents a spectrally whitened output of a matched filter matched to the radio channel.

In an embodiment, the spectrally whitened data stream is represented by $$H^H R_n^{-1} y$$

where H represents a channel state of a radio channel, $$R_n^{-1}$$

represents an inverse covariance matrix of the estimated interference, H represents hermitean transpose of a matrix, and y represents the received first data stream and the second data stream.

According to another aspect, there is provided a method for an apparatus of an access node, comprising: receiving, by the apparatus from a first radio unit of the access node via a first interface, a first spectrally whitened channel parameter and a first spectrally whitened data stream; receiving, by the apparatus from a second radio unit of the access node via a second interface, a second spectrally whitened channel parameter and a second spectrally whitened data stream; summing, by the apparatus, the first spectrally whitened channel parameter with the second spectrally whitened channel parameter and summing the first spectrally whitened data stream with the second spectrally whitened data stream; and extracting, by the apparatus, a desired data stream from the summed spectrally whitened data streams by using the sum of the first spectrally whitened channel parameter and the second spectrally whitened channel parameter.

In an embodiment, the second radio unit is spatially so remote from the first radio unit that a radio channel between the second radio unit and a source device for the data stream is uncorrelated with a radio channel between the first radio unit and the source device.

In an embodiment, the first spectrally whitened channel parameter represents power of a first spectrally whitened radio channel estimated by the first radio unit, and wherein the second spectrally whitened channel parameter represents power of a second spectrally whitened radio channel estimated by the second radio unit.

In an embodiment, the first spectrally whitened channel parameter and the second spectrally whitened channel parameter are represented by $$H_i^H R_{n,i}^{-1} H_i$$

where $H_i$ represents a channel state of a radio channel, $$R_{n,i}^{-1}$$

represents an inverse covariance matrix of interference estimated from the channel state, H represents hermitean transpose of a matrix, and i is an index of a radio unit.

In an embodiment, the first spectrally whitened data stream and the second spectrally whitened data stream represents a spectrally whitened output of a matched filter matched to a radio channel between the respective radio unit and the terminal device.

In an embodiment, the first spectrally whitened data stream and second spectrally whitened data stream are represented by $$H_i^H R_{n,i}^{-1} y_i$$

where $H_i$ represents a channel state of a radio channel, $$R_{n,i}^{-1}$$

represents an inverse covariance matrix of interference estimated from the channel state, H represents hermitean transpose of a matrix, $y_i$ represents a data stream received by a radio unit i, and i is an index of the radio unit.

In an embodiment, the first spectrally whitened channel parameter and the second spectrally whitened channel parameter are represented by $$\tilde{H}_i^H \tilde{H}_i, \text{ where}$$

$$\tilde{H}_i = L_i H_1, \text{ and where}$$

$$R_{n,i}^{-1} = L_i^H L_i$$

where $$L_i^H L_i$$

represents a Cholesky decomposition of an inverse interference covariance matrix $$R_{n,i}^{-1}$$

in radio unit i, H represents hermitean transpose of a matrix, and i is an index of the radio unit.

In an embodiment, the method is performed by a distributed unit connected to a plurality of radio units, the plurality of radio units including the first radio unit and the second radio unit.

In an embodiment, the method is performed by one of the first radio unit and the second radio unit, and the desired data stream is output to a distributed unit connected to a plurality of radio units, the plurality of radio units including the first radio unit and the second radio unit.

According to another aspect, there is provided a method for a radio unit of an access node, comprising: receiving, by the radio unit from a terminal device, a first data stream via a radio channel and a first receiver antenna and at least a second data stream via the radio channel and a second receiver antenna; performing, by the radio unit, channel estimation of the radio channel and estimating interference imposed on the received first data stream and the second data stream in the radio channel; computing, by the radio unit on the basis of the interference estimation, a spectrally whitened channel parameter representing channel state information; performing, by the radio unit, interference rejection combining on the received data stream, wherein the interference rejection combining comprises spectral whitening of the received data stream by using the estimated interference and combining the first data stream with the second data stream, thus providing a spectrally whitened data stream; and outputting, by the radio unit via an interface, the spectrally whitened data stream and the spectrally whitened channel parameter to another radio unit of the access node or to a distributed unit of the access node, the distributed unit connected to a plurality of radio units of the access node.

In an embodiment, the spectrally whitened channel parameter represents power of a spectrally whitened radio channel.

In an embodiment, the spectrally whitened channel parameter is represented by $$H^H R_n^{-1} H$$

where H represents a channel state of the radio channel, $$R_n^{-1}$$

represents an inverse covariance matrix of the estimated interference, and H represents hermitean transpose of a matrix.

In an embodiment, the spectrally whitened data stream represents a spectrally whitened output of a matched filter matched to the radio channel.

In an embodiment, the spectrally whitened data stream is represented by $$H^H R_n^{-1} y$$

where H represents a channel state of a radio channel, $$R_n^{-1}$$

represents an inverse covariance matrix of the estimated interference, H represents hermitean transpose of a matrix, and y represents the received first data stream and the second data stream.

According to an aspect, there is provided a computer program product embodied on a computer-readable medium and comprising a computer program code readable by a computer, wherein the computer program code configures the computer to carry out a computer process comprising in an apparatus: receiving, by the apparatus from a first radio unit of the access node via a first interface, a first spectrally whitened channel parameter and a first spectrally whitened data stream; receiving, by the apparatus from a second radio unit of the access node via a second interface, a second spectrally whitened channel parameter and a second spectrally whitened data stream; summing, by the apparatus, the first spectrally whitened channel parameter with the second spectrally whitened channel parameter and summing the first spectrally whitened data stream with the second spectrally whitened data stream; and extracting, by the apparatus, a desired data stream from the summed spectrally whitened data streams by using the sum of the first spectrally whitened channel parameter and the second spectrally whitened channel parameter.

According to an aspect, there is provided a computer program product embodied on a computer-readable medium and comprising a computer program code readable by a computer, wherein the computer program code configures the computer to carry out a computer process comprising in radio unit: receiving, by the radio unit from a terminal device, a first data stream via a radio channel and a first receiver antenna and at least a second data stream via the radio channel and a second receiver antenna; performing, by the radio unit, channel estimation of the radio channel and estimating interference imposed on the received first data stream and the second data stream in the radio channel; computing, by the radio unit on the basis of the interference estimation, a spectrally whitened channel parameter representing channel state information; performing, by the radio unit, interference rejection combining on the received data stream, wherein the interference rejection combining comprises spectral whitening of the received data stream by using the estimated interference and combining the first data stream with the second data stream, thus providing a spectrally whitened data stream; and outputting, by the radio unit via an interface, the spectrally whitened data stream and the spectrally whitened channel parameter to another radio unit of the access node or to a distributed unit of the access node, the distributed unit connected to a plurality of radio units of the access node.

8

LIST OF DRAWINGS

Embodiments are described below, by way of example only, with reference to the accompanying drawings, in which FIG. 1 illustrates a wireless communication scenario to which some embodiments of the invention may be applied;

DESCRIPTION OF EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. A person skilled in the art will realize that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
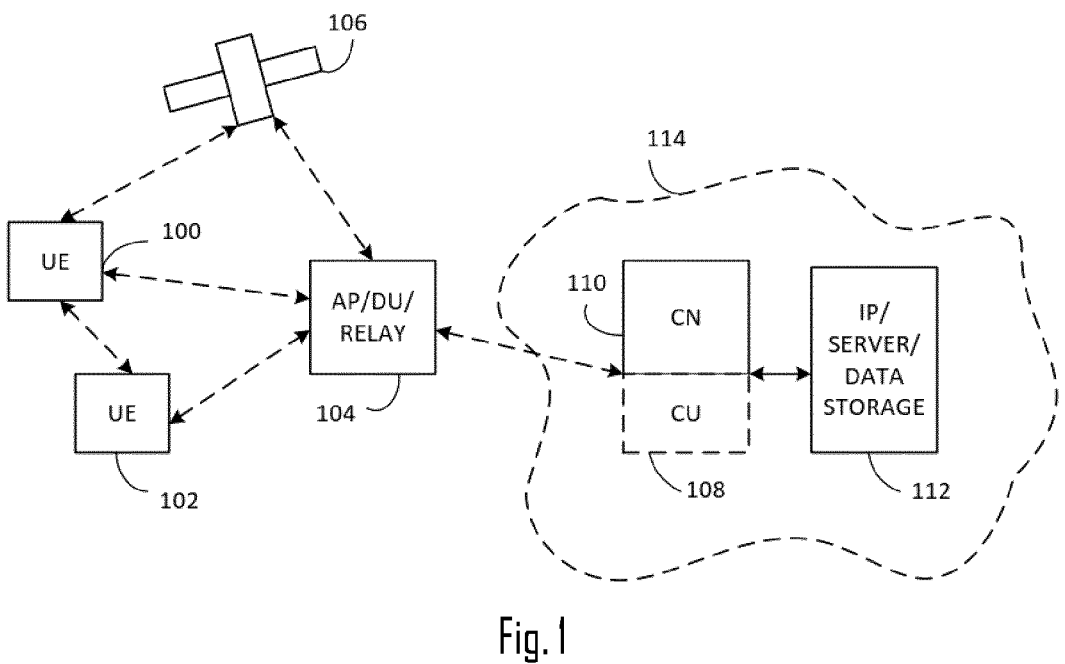

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows terminal devices or user devices 100 and 102 configured to be in a wireless connection on one or more communication channels in a cell with an access node (such as (e/g)NodeB) 104 providing the cell. (e/g)NodeB refers to an eNodeB or a gNodeB, as defined in 3GPP specifications. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used not only for signalling purposes but also for routing data from one (e/g)NodeB to another. The (e/g)NodeB is a computing device configured to control the radio resources of communication system it is coupled to. The NodeB may also be referred to as a base station, an access point, an access node, or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilise cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and typically fully centralized in the core network. The low-latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of functions between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or node B (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway, maritime, and/or aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Figure 2:
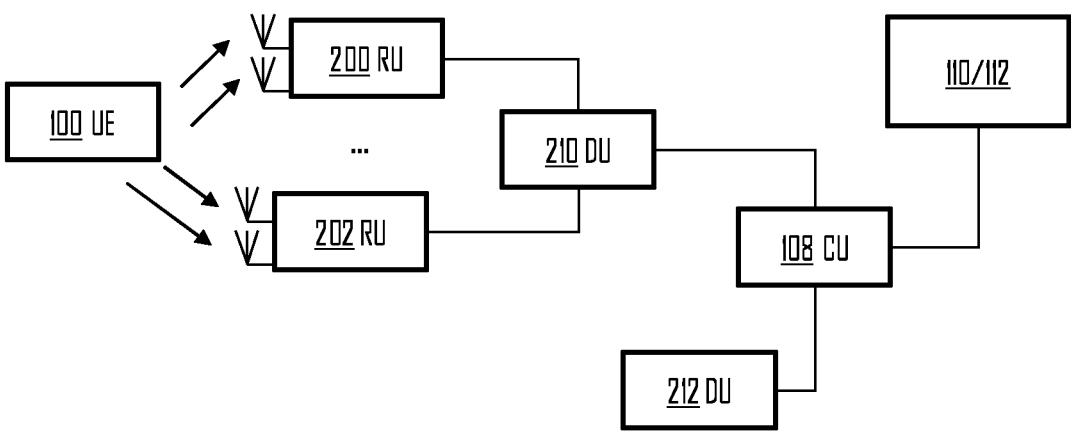
FIG. 2 illustrates a configuration of an access node comprising multiple logical entities.

As described above, functions of an access node may be distributed amongst multiple logically and physically separate entities: a centralized unit (CU) 108, a distributed unit (DU), and a radio unit (RU). RU is in some literature called a remote radio unit or a remote radio head. FIG. 2 illustrates the logic of the access node. One central unit 108 may control multiple DUs 210, 212 and carry out higher protocol layer functions such as mobility control, positioning, session management, radio resource control functions, and packet data convergence protocol (PDCP) functions. A DU 210 or 212 may be connected to multiple RUs 200, 202 and perform lower protocol functions such medium access control (MAC) and some physical layer functions. The RUs 200, 202 perform at least physical layer function on a radio frequency and on baseband. Each RU 200, 202 may comprise multiple antennas to establish multi-antenna connectivity and MIMO (multiple-input-multiple-output) transmission capability for communication with the UE 100. The logical split of functions between the entities of the access node may vary, depending on the implementation.

Figure 3:
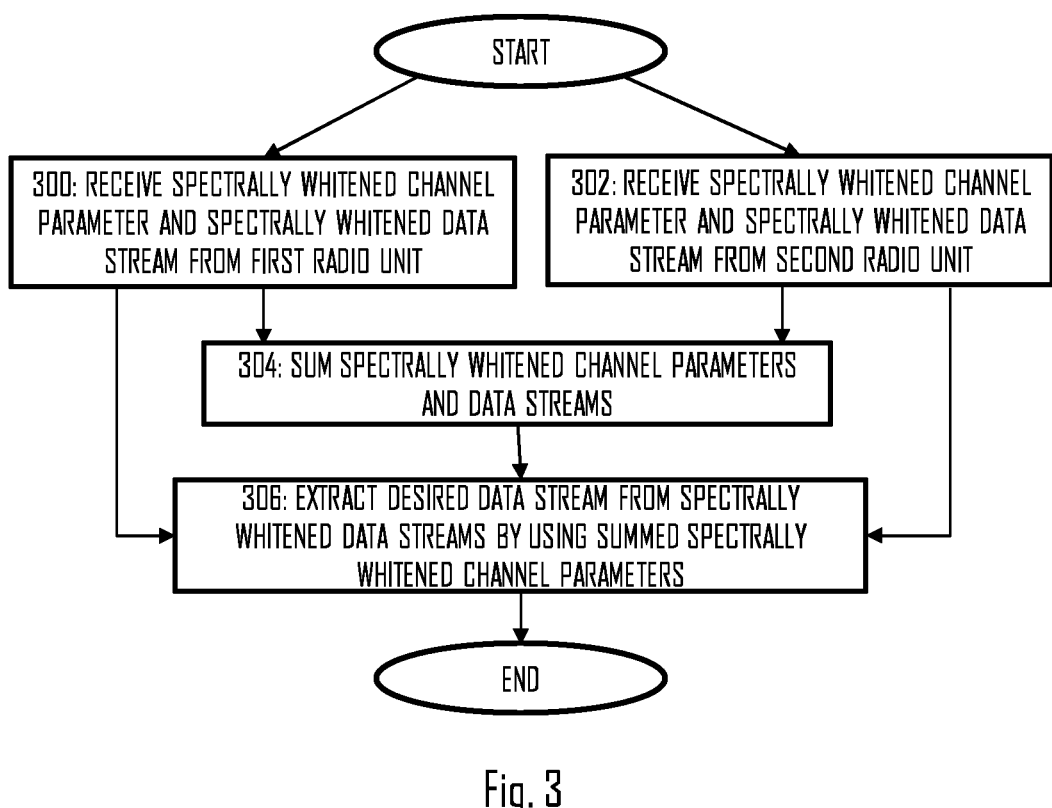
FIG. 3 illustrates an embodiment of a process for processing a received data stream in a distributed unit.

FIG. 3 illustrates an embodiment for performing interference rejection in the access node. Referring to FIG. 3, such a process performed in an apparatus for the access node comprises: receiving (block 300), from a first radio unit of the access node via a first interface, a first spectrally whitened channel parameter and a first spectrally whitened data stream; receiving (block 302), from a second radio unit of the access node via a second interface, a second spectrally whitened channel parameter and a second spectrally whitened data stream; summing (block 304) the first spectrally whitened channel parameter with the second spectrally whitened channel parameter and summing the first spectrally whitened data stream with the second spectrally whitened data stream; and extracting (block 306) a desired data stream from the summed first spectrally whitened data stream and second spectrally whitened data stream by using the sum of the first spectrally whitened channel parameter and the second spectrally whitened channel parameter.

Performing spectral whitening in the RU reduces the amount of signalling in the interfaces. Capability of combining the spectrally whitened channel parameters by superposition (summing) provides further advantages. Radio units may be added to and removed from the system in a straightforward manner.

Figure 4:
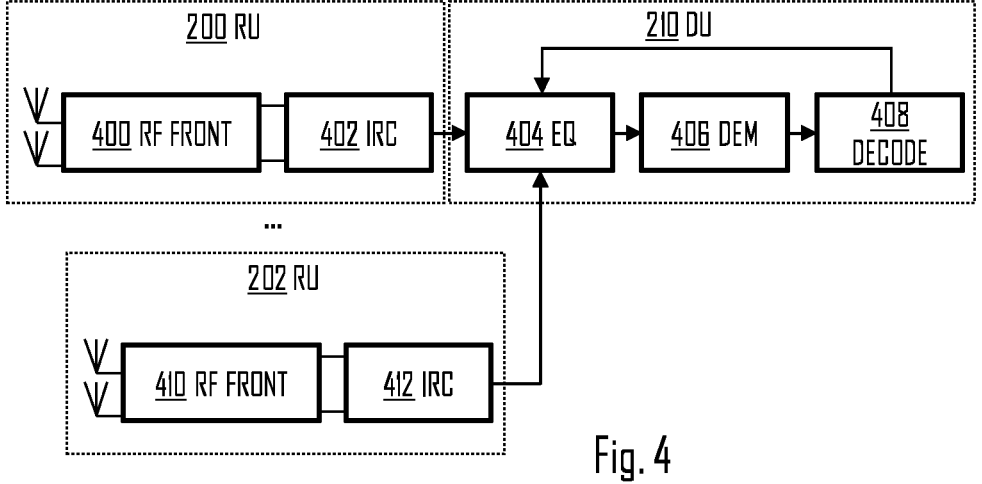
FIG. 4 illustrates an embodiment of a receiver structure.

FIG. 4 illustrates an embodiment for implementing the process of FIG. 3 in the system of FIG. 2. Referring to FIG. 4, a signal or a data stream transmitted by an UE 100 may be received in multiple RUs. Each RU 200, 202 may include a radio frequency (RF) front end components 400, 410 comprising an antenna array of multiple antenna elements and RF receiver circuitries such as a low-noise amplified, a filter, a frequency-converter and an analogue-to-digital converter. A signal may be received from the UE through each of the multiple antenna elements and processed in the RF front end 400, 410. The signal received through each antenna may be provided in a separate signal path in the RF front end 400, 410. The signals may then be fed, optionally through other signal processing circuitries of the receiver, to an interference rejection combining (IRC) circuitry 402, 412. The IRC circuitry 402, 412 may estimate channel state information of a radio channel between the respective RF front end 400, 410 and the UE that transmitted the signal and, then, combine the signal paths by using the channel state information. The IRC 402, 412 may implement a part of a minimum mean square error (MMSE) IRC equalizer described below. After combining the signal paths, an IRC-processed signal may be output to the interface as the spectrally whitened data stream. The IRC 402, 412 may also compute the spectrally whitened channel parameter and output the parameter to the interface.

The DU may collect the spectrally whitened data streams from the multiple RUs 200, 202, and there may be more than two RUs, as illustrated in FIG. 4. In the DU, the spectrally whitened parameters received from the different RUs may be summed together, and the spectrally whitened data streams received from the different RUs may be summed together. An equalizer 404 may perform the summing and, thereafter, equalize the summed spectrally whitened data stream by using the summed spectrally whitened channel parameter in block 306. Thereafter, a demodulator 406 may demodulate the equalized data stream and a decoder 408, e.g. a low-density parity check (LDPC) decoder, may decode the demodulated symbols. A feedback channel from the decoder 408 to the equalizer 404 may be provided to change the equalization parameters.

Figures 5, 6:
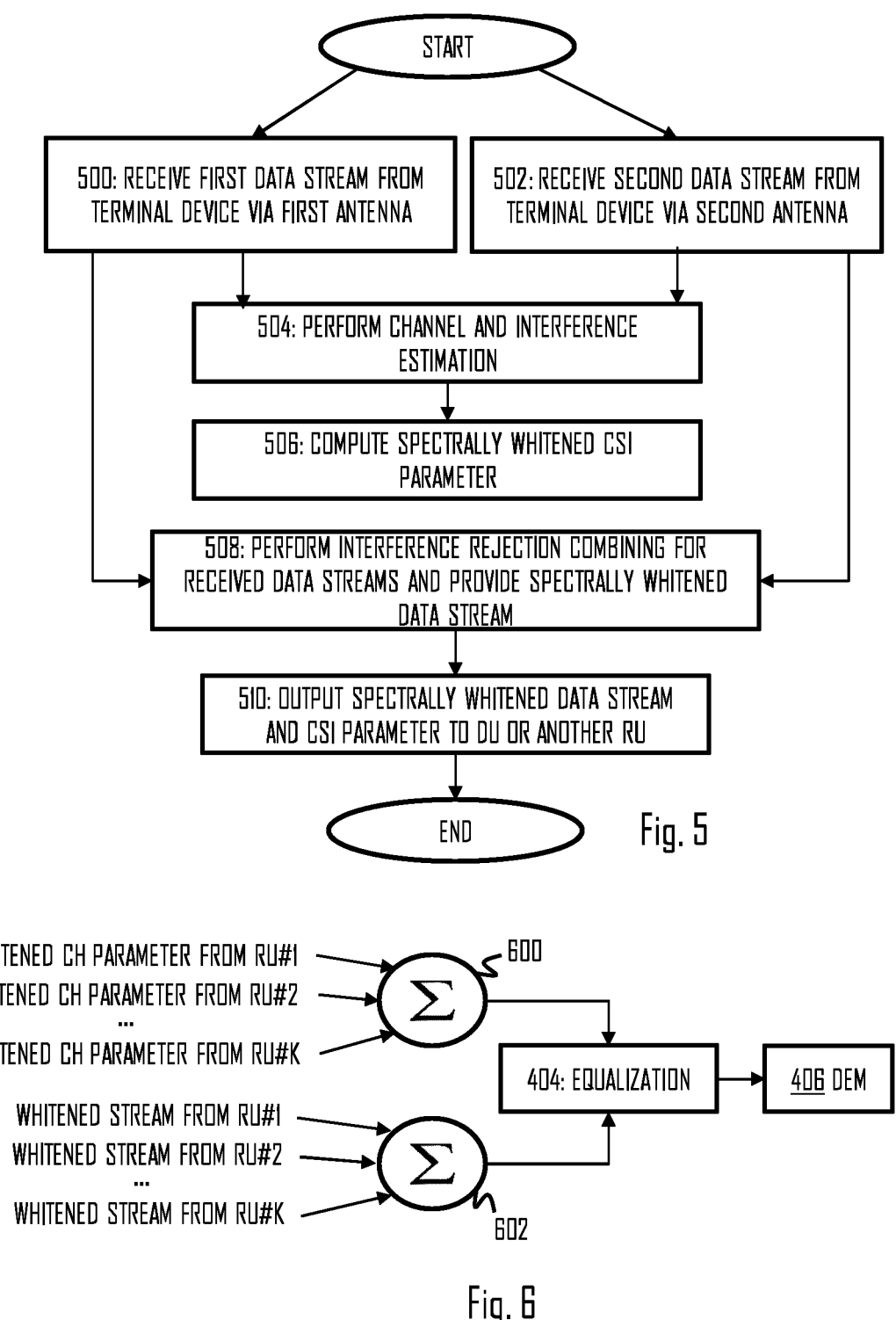
FIG. 5 illustrates an embodiment of a process for processing a received data stream in a radio unit.
FIGS. 6 and 7 illustrate embodiments for combining spectrally whitened parameters and spectrally whitened data streams.

As described above, the RU may perform the IRC for data streams received through the multiple antennas of the RU. FIG. 5 illustrates an embodiment of a procedure executed in the RU 200, 202. Referring to FIG. 5, the procedure comprises: receiving, by the radio unit from a terminal device, a first data stream (block 500) via a radio channel and a first receiver antenna and at least a second data stream (block 502) via the radio channel and a second receiver antenna; performing (block 504), by the radio unit, channel estimation of the radio channel and estimating interference imposed on the received first data stream and the second data stream in the radio channel; computing (block 506), by the radio unit on the basis of the interference estimation, a spectrally whitened channel parameter representing channel state information; performing (block 508), by the radio unit, interference rejection combining on the received data stream, wherein the interference rejection combining comprises spectral whitening of the received data stream by using the estimated interference and combining the first data stream with the second data stream, thus providing a spectrally whitened data stream; and outputting (block 510), by the radio unit via an interface, the spectrally whitened data stream and the spectrally whitened channel parameter to another radio unit of the access node or to a distributed unit of the access node, the distributed unit connected to a plurality of radio units of the access node.

From one perspective, the above-described embodiment can be understood such that each RU 200, 202 performs the IRC and cancels the adverse effects of the radio channel between the UE 100 and the respective RU. The radio channel imposes on a signal (e.g. the data stream) interference that is or at least comprises spectrally coloured (correlated) interference components. The spectrally coloured interference may be estimated by forming a channel estimate and, on the basis of the channel estimate, an interference covariance matrix described in greater detail below. The spectrally coloured interference may be removed from the signal be computing an inverse of the interference covariance matrix and by multiplying the signal with the inverse covariance matrix, thus performing spectral whitening of the signal and removing the coloured interference from the signal. The DU collects the data streams transmitted by the UE and received by the RUs, combines them and, then, performs the remaining steps of the cancellation jointly in a centralized manner. In other words, each RU observes the radio channel between the respective RU and the UE, and the DU sees the radio channel as a combination of radio channels observed by the RUs. In the embodiments described above, some of such channel compensation is performed in a distributed manner (the IRC at the RUs) and some of the channel compensation is performed in a joint manner (the equalization at the DU).

The basis for summing the spectrally whitened channel parameters is that the RUs are considered to be spatially so remote from one another that they experience different and uncorrelated radio channels towards the UE. In a typical massive MIMO or CoMP situation, the RUs are inherently spatially distant from one another.

Let us then describe the embodiments from a theoretical viewpoint. The IRCs 402, 412 together with the equalizer 404 may from the above-described MMSE-IRC receiver/equalizer that can be represented by the following Equation $$x = \left(H^H R_n^{-1} H + R_x^{-1}\right)^{-1} H^H R_n^{-1} y \qquad (1)$$

where x denotes an output vector of the receiver/equalizer, H represents a channel matrix where having one column per receiver antenna, $R_n$ represents an interference (including noise) covariance matrix, $R_x$ represents a signal power of the received signal samples (may be assumed to be an identity matrix in many implementations), and y represents a signal received by an RU. Now, let us consider the above-described CoMP scenario where the desired signal is received via multiple RUs. In such a case, the channel matrix is composed of several channel matrices as follows:

$$H = [H_1, H_{2)}, \dots ]^T \qquad (2)$$

The number of channel matrices in H equals to the number of RUs that is denoted by k in the following. Since the desired signal transmitted by the UE is received by the k RUs, the received signal gets the following form:

$$y = [y_1, y_2, \dots ]^T \qquad (3)$$

The number of received signal vectors in y equals to k.

For the IRC purposes, each RU may estimate a noise covariance matrix $R_{n,i}$ that represents the interference (including noise) induced to the desired signal in the channel. i represents an index of the RU. From the perspective of the DU, the covariance matrix is the combination of $R_{n,i}$ estimated by the RUs as follows:

$$R_n = \begin{pmatrix} R_{n,1} & 0 & 0 & \dots & 0 \\ 0 & R_{n,2} & 0 & \dots & 0 \\ 0 & & \dots & & 0 \\ 0 & 0 & 0 & \dots & R_{n,k} \end{pmatrix} \quad (4)$$

Since the RUs are considered as distant from one another, the combined interference covariance matrix $R_n$ becomes block-diagonal, as represented in Equation (4). Similarly, an inverse interference covariance matrix $R_n^{-1}$ is block diagonal as follows:

$$R_n^{-1} = \begin{pmatrix} R_{n,1}^{-1} & 0 & 0 & \dots & 0 \\ 0 & R_{n,2}^{-1} & 0 & \dots & 0 \\ 0 & & \dots & & 0 \\ 0 & 0 & 0 & \dots & R_{n,k}^{-1} \end{pmatrix} \quad (5)$$

With the formulation of Equations (4) and (5), Equation (1) simplifies to the following form:

$$\hat{x} = \left( \sum_i H_i^H R_{n,i}^{-1} H_i + R_x^{-1} \right)^{-1} \sum_i \left( H_i^H R_{n,i}^{-1} y_i \right) \quad (6)$$

where i runs from 1 to k. With the MMSE-IRC receiver, the first spectrally whitened channel parameter and the second spectrally whitened channel parameter are represented in Equation (6) by $$H_i^H R_{n,i}^{-1} H_i \quad (7)$$

where $H_i$ represents a channel state of a radio channel, $$R_{n,i}^{-1}$$

represents an inverse covariance matrix of the interference (including noise) estimated from the channel state, H represents hermitean transpose of a matrix, and i is an index of the RU. The parameter in Equation (7) may be understood to represent a power of a spectrally whitened radio channel estimated by the respective RU. Each RU may compute this parameter and transmit the parameter to the DU via the interface.

In a similar manner, the first spectrally whitened data stream and second spectrally whitened data stream may be represented in Equation (6) by $$H_i^H R_{n,i}^{-1} y_i \quad (8)$$

where $H_i$ represents a channel state of a radio channel, $$R_{n,i}^{-1}$$

represents an inverse covariance matrix of the interference (including noise) estimated from the channel state, H represents hermitean transpose of a matrix, $y_i$ represents the received data stream at $RU_i$, and i is the index of the RU. The data stream in Equation (8) may be understood to represent a spectrally whitened output from a matched filter matched to the channel. The matched filter may be configured to perform the above-described IRC. The data stream of Equation (8) may thus be computed in the RUs (block 508) and output to the DU via the interface (block 510 and blocks 300 and 302). The DU may then sum the parameters of Equation (7) and the data streams of Equation (8) according to Equation (6) to acquire the estimate $\hat{x}$ of the transmitted data stream on the basis of the received data stream y.

In another embodiment, the spectrally whitened channel parameter of Equation (7) may be replaced in Equation (6) by the following parameter:

$$\tilde{H}_i^H \tilde{H}_i, \text{ where} \quad (9)$$

$$\tilde{H}_i = L_i H_i, \text{ and where}$$

$$R_{n,i}^{-1} = L_i^H L_i$$

where $$L_i^H L_i$$

represents a Cholesky decomposition of the inverse interference covariance matrix in the RU. In case of using another decomposition, e.g. an LU decomposition, another type of spectrally whitened channel parameter may be derived.

In other words, the parameter of Equation (7) or (9) and the whitened data stream of Equation (8) may be computed in the RUs and then output for summing and remaining equalization to the interface. In other words, there is no need to forward the received signal samples to the DU for combining. Accordingly, the amount of information transferred over the interface can be reduced.

In embodiments where the RU receives duplicates of the data stream from the terminal device via independent routes, e.g. via multiple antennas or by using diversity transmission, the RU may combine such duplicates of the data stream in the IRC, for example. In such an embodiment, the RU may receive multiple duplicates of the data stream via the multiple antennas and combine the multiple duplicates of the data stream into a single data stream that is output to the interface. Such combining also reduces traffic in the interface.

As can be seen, providing the DU with the capability of summing the spectrally whitened channel parameters and the spectrally whitened data streams, the receiver structure remains the same regardless of the number of RUs. Accordingly, the receiver structure is very flexible to changes in the number RUs connected to the DU.

Above, the embodiment of the MMSE-IRC receiver was disclosed, as well as the parameters transferred over the interface (Equations (7) and (8) or Equations (9) and (8)). The same or substantially similar parameters may be applied to other receiver structures in a straightforward manner. For example, a general log-likelihood ratio (LLR) receiver can be expressed by using the same parameters and, therefore, the described embodiments can be modified into a maximum a posteriori probability (MAP) receiver or a maximum likelihood sequence estimation (MLSE) receiver or their approximations. Thus, the characteristic feature of the invention can be characterized for many receiver structures.

In an embodiment, the apparatus executing the process of FIG. 3 is comprised in the DU connected to a plurality of RUs. FIG. 6 illustrates such an embodiment where the DU 210 receives the spectrally whitened channel parameters from multiple RUs via respective interfaces and sums the spectrally whitened channel parameters in block 600. The output may then be fed to the equalizer 404, following FIG. 4. In a similar manner, the DU 210 receives the spectrally whitened data streams from the same RUs and sums the spectrally whitened data streams in block 602. The output may then be fed to the equalizer 404, following FIG. 4.

Figure 7:
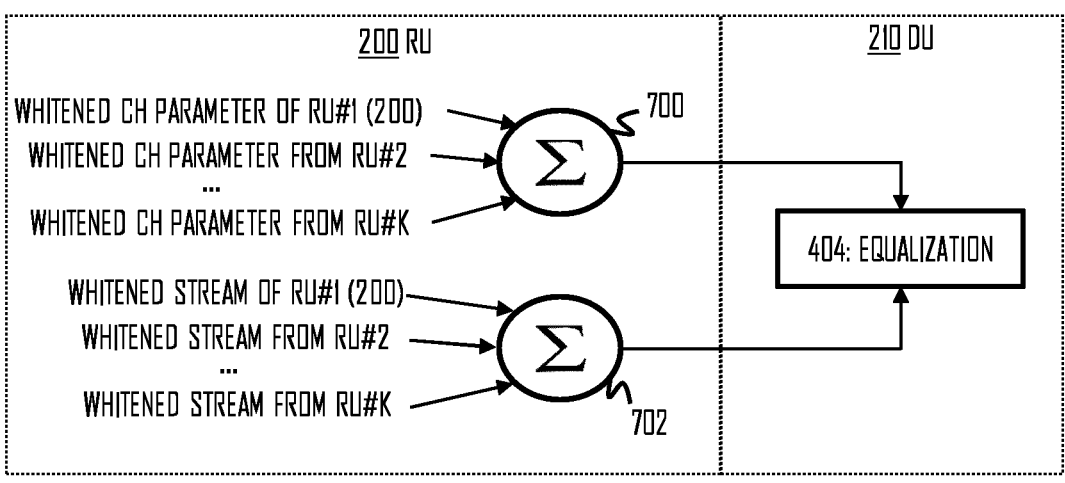

In an embodiment the apparatus executing the process of FIG. 3 is comprised in the RU. FIG. 7 illustrates such an embodiment where the RU 200 itself receives a data stream from the UE and computes the first spectrally whitened channel parameters and the first spectrally whitened stream. The RU 200 additionally receives one or more spectrally whitened channel parameters and the respective one or more spectrally whitened streams from other RUs connected to the same DU. The RU 200 may then sum the received spectrally whitened channel parameters with the spectrally whitened channel parameter estimated in the RU 200 in block 700. Further, the RU may sum the received spectrally whitened data streams with the spectrally whitened data stream computed in the RU 200 (block 702). The RU 200 may then output the summed spectrally whitened channel parameter and the summer spectrally whitened data stream to the DU 210 via the interface for equalization.

Yet another embodiment is a hybrid of FIGS. 6 and 7. One of the RUs may perform the summing for one or more of other RUs connected to the same DU while at least one of the remaining RUs may output the spectrally whitened channel parameter and the spectrally whitened data stream to the DU for summing. In such a case, at least one of the RUs may be implemented according to the embodiment of FIG. 7 while the DU may be implemented according to the embodiment of FIG. 6.

In the embodiments, the summing is performed before the equalization. In other words, the equalizer 404 operates with the sums of the individual data streams and the sum(s) of the spectrally whitened channel parameter(s). Accordingly, the equalizer remains the same regardless of the number of the input streams (the number of RUs).

In an embodiment the DU may control the cooperative reception by the RUs. The DU may, for example, select a subset of the RUs connected to the DU that shall receive the data stream of a particular UE and perform the above-described IRC on the data stream received from the UE. The selection may be signaled from the DU to the respective RUs via the respective interfaces. A message carrying the selection or directly related to the selection may additionally carry parameters related to the reception. Such parameters may include a location of the particular UE, a demodulation reference signal of the particular UE to facilitate the channel estimation needed for estimating the $H_i$, a beamforming configuration (beam coefficients) of the particular UE, time-frequency resources allocated to the particular UE, etc.

Above, the computation of the spectrally whitened channel parameters and the spectrally whitened data streams are described in a context of a single data stream, unless otherwise described. In other words, the above-described processing may be understood as processing within one MIMO layer. In a case where multiple spatial MIMO layers are provided between the access node and the terminal device, the above-described processing may be performed separately for each spatial MIMO layer.

Figure 8:
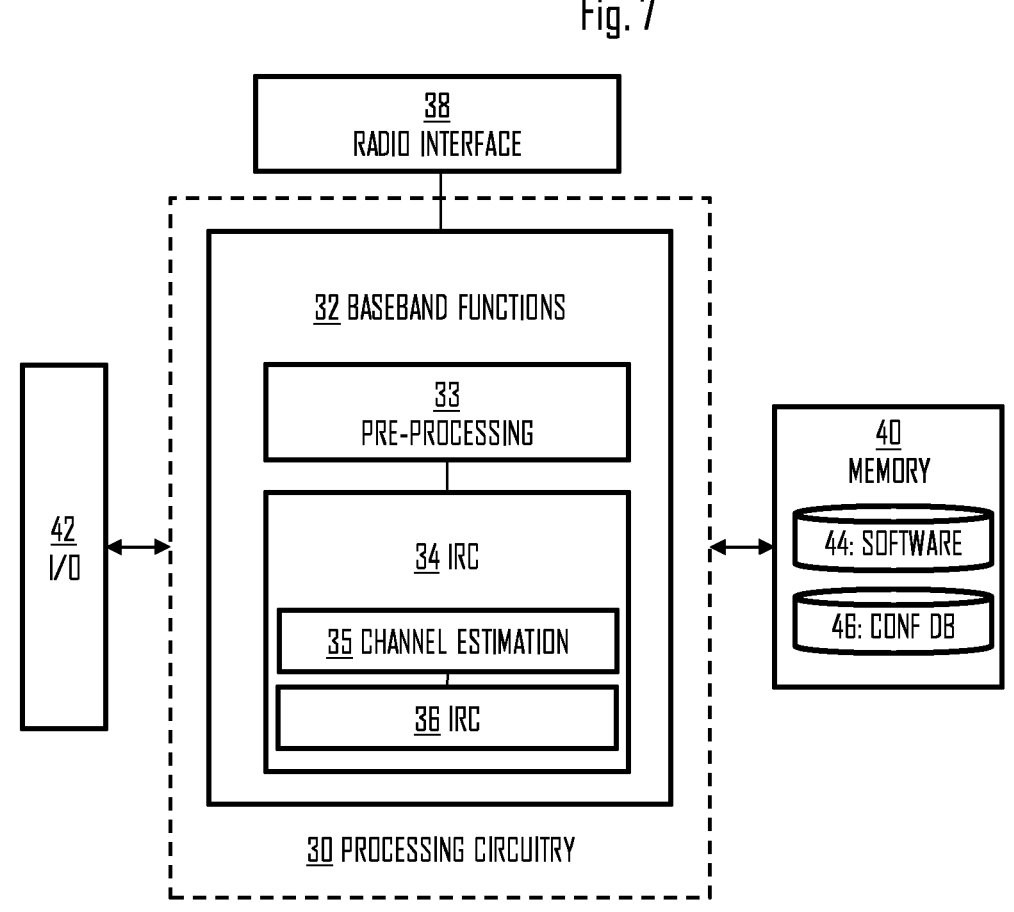
FIGS. 8 and 9 illustrate block diagrams of structures of apparatuses according to some embodiments of the invention.

FIG. 8 illustrates an embodiment of a structure of the above-mentioned functionalities of an apparatus executing the functions of the RU 200, 202 in the embodiments described above, e.g. the process of FIG. 5 or any one of its embodiments. In an embodiment, the apparatus may be a circuitry or an electronic device realizing some embodiments of the invention in the RU. The apparatus carrying out the above-described functionalities may thus be comprised in such a device, e.g. the apparatus may comprise a circuitry such as a chip, a chipset, a processor, a micro controller, or a combination of such circuitries for the RU.

Referring to FIG. 8, the apparatus may comprise at least one processor or a processing circuitry 30 providing the apparatus with capability of performing at least some of physical layer signal processing functions of the access node 104. The processing circuitry 30 may employ a radio interface 38 providing the apparatus with radio communication capability. The radio interface 38 may comprise multiple antennas and associated analogue components needed for transmitting and receiving radio signals, e.g. an amplifier, filter, frequency-converter, and an analogue-to-digital converter. The processing circuitry 30 or the radio interface 42 may comprise a radio modem configured to carry out transmission and reception of messages in the wireless network.

The processing circuitry 30 may comprise a baseband circuitry 32 configured to carry out baseband signal processing function on the data streams received from UEs. The baseband circuitry 32 may comprise a pre-processing circuitry 33 configured to pre-process a signal received from the radio interface 38. The pre-processing may include, for example, extracting a demodulation reference signal from the received signal and outputting the reference signal to a channel estimation circuitry 35. The pre-processing may further include extracting a data stream from the received signal and outputting the data stream to an IRC circuitry 36. The channel estimation circuitry 35 may be configured to estimate a channel state of the radio channel between the RU and the UE, e.g. the channel matrix $H_i$ described above, and output the channel state to the IRC circuitry 36. The IRC circuitry 36 may be configured to perform spectral whitening on the channel estimate and on the received data stream and to estimate the spectrally whitened channel parameter and the spectrally whitened data stream. The IRC circuitry 36 may then output the spectrally whitened channel parameter and the spectrally whitened data stream to the above-described interface 42 towards the DU. In an embodiment, the interface 42 is called a fronthaul interface.

The processing circuitry 30 may comprise at least one processor. The apparatus may further comprise a memory 40 storing one or more computer program products 44 configuring the operation of said processor(s) of the apparatus. The memory 40 may be implemented using any suitable data storage technology, such as semiconductor-based memory devices, flash memory, magnetic memory devices and systems, optical memory devices and systems, fixed memory and removable memory. The memory 40 may further store a configuration database 46 storing operational configurations of the apparatus. The configuration database 46 may, for example, store the rules for estimating the spectrally whitened channel parameter and the spectrally whitened data stream.

Figure 9:
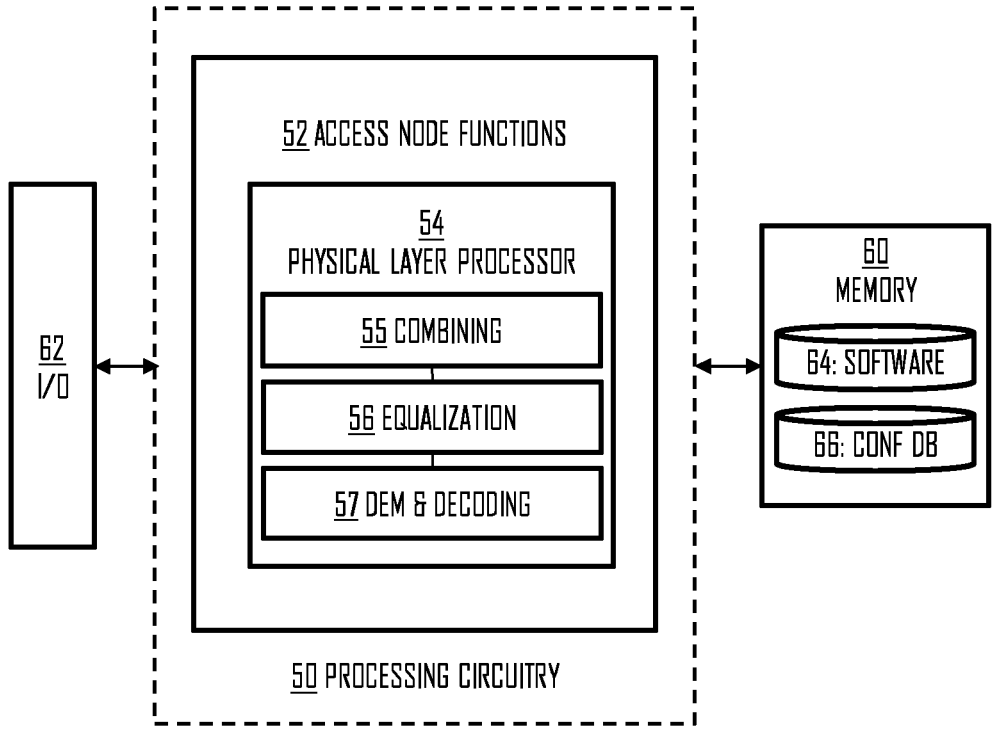

FIG. 9 illustrates an apparatus comprising a processing circuitry 50, such as at least one processor, and at least one memory 60 including a computer program code (software)

64, wherein the at least one memory and the computer program code (software) are configured, with the at least one processor, to cause the apparatus to carry out the process of FIG. 3 or any one of its embodiments described above. The apparatus may be for the DU of the access node (e.g. the gNB). The apparatus may be a circuitry or an electronic device realizing some embodiments of the invention in the DU. The apparatus carrying out the above-described functionalities may thus be comprised in such a device, e.g. the apparatus may comprise a circuitry such as a chip, a chipset, a processor, a micro controller, or a combination of such circuitries for the DU.

Referring to FIG. 9, the memory 60 may be implemented using any suitable data storage technology, such as semiconductor-based memory devices, flash memory, magnetic memory devices and systems, optical memory devices and systems, fixed memory and removable memory. The memory 60 may comprise a configuration database 66 for storing configuration parameters, e.g. the parameters for the above-described equalization and/or the spectrally whitened channel parameters received from the RUs, as described above.

The apparatus may further comprise a communication interface 62 comprising hardware and/or software for realizing communication connectivity with the RUs, as described above. The communication interface 62 may be counterpart to the communication interface 42 of FIG. 8. The communication interfaces 42, 62 may support wired or wireless communication.

The processing circuitry 50 may comprise a module 52 configured to perform at least some of the functions of the access node 104. The functions may include at least some of the physical layer functions of the access node, including the extraction of the desired signal from a sum of spectrally whitened data streams received from the RUs. In some embodiments, the module 52 is configured to perform some of higher layer functions of the access node 104, e.g. medium access layer functions. The module 52 may include physical layer processor 54 configured to perform the process of FIG. 3. The processor 54 may be configured to carry out the summing of the spectrally whitened channel parameters received from the RUs and the summing of the spectrally whitened data streams received from the RUs, as described above (module 55). After said summing, an equalization circuitry 56 may be configured to perform equalization of the summed spectrally whitened data stream by using the spectrally whitened channel parameter (module 56). Thereafter, the resulting equalized data stream may be demodulated and decoded in module 57.

As used in this application, the term 'circuitry' refers to one or more of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention. The processes or methods described in FIGS. 3 and 5 or any of the embodiments thereof may also be carried out in the form of one or more computer processes defined by one or more computer programs. A separate computer program may be provided in one or more apparatuses that execute functions of the processes described in connection with the Figures. The computer program(s) may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

Embodiments described herein are applicable to wireless networks defined above but also to other wireless networks. The protocols used, the specifications of the wireless networks and their network elements develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. Embodiments are not limited to the examples described above but may vary within the scope of the claims.

The invention claimed is:

1. An apparatus for an access node, comprising:
at least one processor; and
at least one memory including computer program code, the at least one memory and computer program code configured to, with the at least one processor, cause the apparatus to:
receive, from a first radio unit of the access node via a first interface, a first spectrally whitened channel parameter and a first spectrally whitened data stream;
receive, from a second radio unit of the access node via a second interface, a second spectrally whitened channel parameter and a second spectrally whitened data stream;
sum the first spectrally whitened channel parameter with the second spectrally whitened channel parameter and sum first spectrally whitened data stream with the second spectrally whitened data stream; and
extract a desired data stream from the sum of the spectrally whitened data streams by using the sum of the first spectrally whitened channel parameter and the second spectrally whitened channel parameter.

2. The apparatus of claim 1, wherein the second radio unit is spatially so remote from the first radio unit that a radio channel between the second radio unit and a source device for the data stream is uncorrelated with a radio channel between the first radio unit and the source device.

3. The apparatus of claim 1, wherein the first spectrally whitened channel parameter represents power of a first spectrally whitened radio channel estimated by the first radio unit, and wherein the second spectrally whitened channel parameter represents power of a second spectrally whitened radio channel estimated by the second radio unit.

4. The apparatus of claim 3, wherein the first spectrally whitened channel parameter and the second spectrally whitened channel parameter are represented by $$H_i^H R_{n,i}^{-1} H_i$$

where $H_i$ represents a channel state of a radio channel, $$R_{n,i}^{-1}$$

represents an inverse covariance matrix of interference estimated from the channel state, H represents hermitean transpose of a matrix, and i is an index of a radio unit.

5. The apparatus of claim 1, wherein the first spectrally whitened data stream and the second spectrally whitened data stream represents a spectrally whitened output of a matched filter matched to a radio channel between the respective radio unit and the terminal device.

6. The apparatus of claim 5, wherein the first spectrally whitened data stream and second spectrally whitened data stream are represented by $$H_i^H R_{n,i}^{-1} y_i$$

where $H_i$ represents a channel state of a radio channel, $$R_{n,i}^{-1}$$

represents an inverse covariance matrix of interference estimated from the channel state, H represents hermitean transpose of a matrix, $y_i$ represents a data stream received by a radio unit i, and i is an index of the radio unit.

7. The apparatus of claim 1, wherein the first spectrally whitened channel parameter and the second spectrally whitened channel parameter are represented by $$\tilde{H}_i^H \tilde{H}_i, \text{ where}$$

$$\tilde{H}_i = L_i H_1, \text{ and where}$$

$$R_{n,i}^{-1} = L_i^H L_i$$

where $$L_i^H L_i$$

represents a Cholesky decomposition of an inverse interference covariance matrix $$R_{n,i}^{-1}$$

in radio unit i, H represents hermitean transpose of a matrix, and i is an index of the radio unit.

8. The apparatus of claim 1, wherein the apparatus is comprised in a distributed unit connected to a plurality of radio units, the plurality of radio units including the first radio unit and the second radio unit.

9. The apparatus of claim 1, wherein the apparatus is comprised in one of the first radio unit and the second radio unit, and wherein the at least one memory and computer program code are configured, with the at least one processor, to cause the apparatus to output the desired data stream to a distributed unit connected to a plurality of radio units, the plurality of radio units including the first radio unit and the second radio unit.

10. An apparatus for a radio unit of an access node, comprising:

at least one processor; and at least one memory including computer program code, the at least one memory and computer program code configured to, with the at least one processor, cause the apparatus to:

receive, from a terminal device, a first data stream via a radio channel and a first receiver antenna and at least a second data stream via the radio channel and a second receiver antenna;

perform channel estimation of the radio channel and estimating interference imposed on the received first data stream and the second data stream in the radio channel;

compute, on the basis of the interference estimation, a spectrally whitened channel parameter representing channel state information; and perform interference rejection combining for the received first data stream and second data stream, wherein the interference rejection combining comprises spectral whitening of the received first data stream and second data stream by using the estimated interference and further comprises combining the first data stream with the second data stream, thus providing a spectrally whitened data stream; and output, via an interface, the spectrally whitened data stream and the spectrally whitened channel parameter to another radio unit of the access node or to a distributed unit of the access node, the distributed unit connected to a plurality of radio units of the access node.

11. The apparatus of claim 10, wherein the spectrally whitened channel parameter represents power of a spectrally whitened radio channel.

12. The apparatus of claim 11, wherein the spectrally whitened channel parameter is represented by $$H^H R_n^{-1} H$$

where H represents a channel state of the radio channel, $$R_n^{-1}$$

represents an inverse covariance matrix of the estimated interference, and H represents hermitean transpose of a matrix.

13. The apparatus of claim 10, wherein the spectrally whitened data stream represents a spectrally whitened output of a matched filter matched to the radio channel.

14. The apparatus of claim 13, wherein the spectrally whitened data stream is represented by $$H^H R_n^{-1} y$$

where H represents a channel state of a radio channel, $$R_n^{-1}$$

represents an inverse covariance matrix of the estimated interference, H represents hermitean transpose of a matrix, and y represents the received first data stream and the second data stream.

15. A method for an apparatus of an access node, comprising:

receiving, by the apparatus from a first radio unit of the access node via a first interface, a first spectrally whitened channel parameter and a first spectrally whitened data stream;

receiving, by the apparatus from a second radio unit of the access node via a second interface, a second spectrally whitened channel parameter and a second spectrally whitened data stream;

summing, by the apparatus, the first spectrally whitened channel parameter with the second spectrally whitened channel parameter and summing the first spectrally whitened data stream with the second spectrally whitened data stream; and extracting, by the apparatus, a desired data stream from the summed spectrally whitened data streams by using the sum of the first spectrally whitened channel parameter and the second spectrally whitened channel parameter.

16. A computer program product embodied on a computer-readable medium and comprising a computer program code readable by a computer, wherein the computer program code configures the computer to carry out a computer process comprising all the steps of the method of claim 15.

17. A method for a radio unit of an access node, comprising:

receiving, by the radio unit from a terminal device, a first data stream via a radio channel and a first receiver antenna and at least a second data stream via the radio channel and a second receiver antenna;

performing, by the radio unit, channel estimation of the radio channel and estimating interference imposed on the received first data stream and the second data stream in the radio channel;

computing, by the radio unit on the basis of the interference estimation, a spectrally whitened channel parameter representing channel state information; and performing, by the radio unit, interference rejection combining on the received data stream, wherein the interference rejection combining comprises spectral whitening of the received data stream by using the estimated interference and combining the first data stream with the second data stream, thus providing a spectrally whitened data stream; and outputting, by the radio unit via an interface, the spectrally whitened data stream and the spectrally whitened channel parameter to another radio unit of the access node or to a distributed unit of the access node, the distributed unit connected to a plurality of radio units of the access node.

* * * * *